PRODUCTION OF POTASSIUM CARBONATE
Filed May 24, 1955
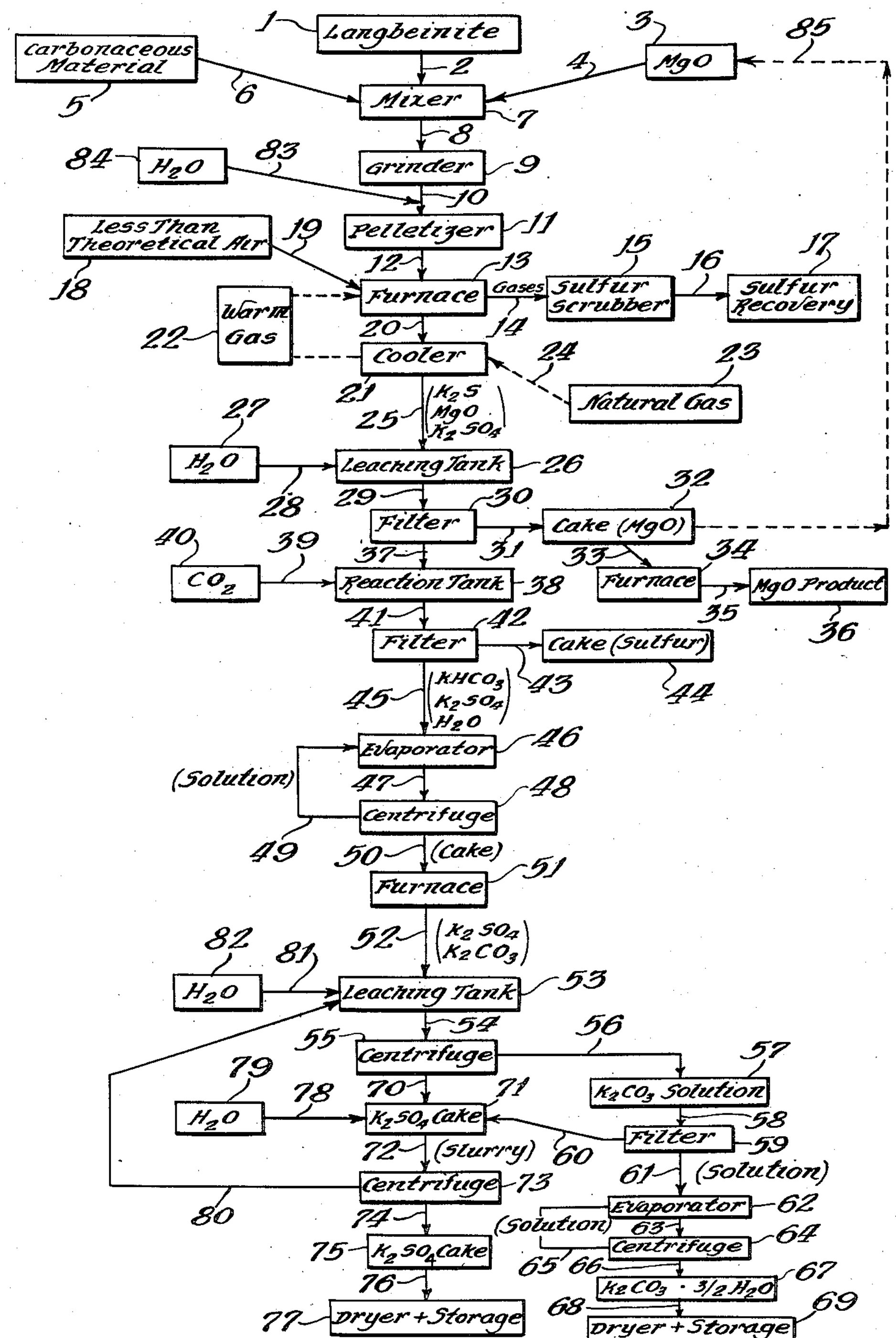
Inventors:
Gunter H. Gloss
William J. McGinnis
By: Ernest V. Haines
Attorney United States Patent Office 2,837,403

Patented June 3, 1958

2,837,403

PRODUCTION OF POTASSIUM CARBONATE

Gunter H. Gloss, Lake Bluff, and William J. McGinnis, Chicago, Ill., assignors to International Minerals & Chemical Corporation, a corporation of New York Application May 24, 1955, Serial No. 510,669

17 Claims. (Cl. 23—33)

This invention relates to the recovery of potassium values from langbeinite ore, and more particularly, to the recovery of potassium values from langbeinite ore in the form of potassium sulfate and potassium carbonate.

Langbeinite is a double salt of potassium sulfate and magnesium sulfate containing 2 molecules of the latter for each molecule of the former. Customarily, the potash values in langbeinite ore have been recovered by reacting langbeinite with an aqueous solution of potassium chloride to produce potassium sulfate. The potassium sulfate was crystallized from the solution and recovered, for example by filtration. The potassium sulfate mother liquor could then be processed by one or another procedure to recover the magnesium values therefrom in the form of magnesium chloride. This process for recovering potash values from langbeinite requires a high purity potassium chloride and adds a fourth component to the system, namely, chloride ions. A process capable of recovering the potash values from langbeinite ore without the use of any potassium chloride whatsoever would have obvious economic advantages, particularly if the magnesium values could be recovered simultaneously in the form of magnesium oxide.

It is an object of this invention to recover the potash values from a double sulfate salt of potassium and magnesium without using potassium chloride.

It is another object of this invention to recover the potash values from langbeinite in the form of potassium sulfate and potassium carbonate.

It is a further object of this invention to recover the potash values of langbeinite ore as potassium sulfate and potassium carbonate which are virtually free of chloride contamination.

Another object of this invention is to provide a simple commercially feasible process for recovering the potash values from langbeinite ore and to produce as a coproduct magnesium oxide which is suitable for refractory or chemical applications.

In accordance with this invention, a double sulfate salt of potassium and magnesium, such as langbeinite, leonite or schoenite, containing less than about 2% sodium chloride by weight is mixed with a carbonaceous material, such as for example, petroleum coke, and the mixture comminuted and formed into pellets. The pellets are heated in a furnace at a temperature between about 725° C. and about 1000° C. until the potassium sulfate component of the double salt is substantially reduced to potassium sulfide. The magnesium sulfate component is reduced simultaneously to magnesium oxide. The reaction product mixture is then cooled and treated with water to dissolve the potassium compounds present, and the insoluble magnesium oxide is separated from the solution, for example by filtration. The leaching solution is then carbonated to convert any potassium sulfide present to potassium carbonate and potassium bicarbonate, and the carbonated solution which also contains some potassium sulfate is treated to recover potassium carbonate and potassium sulfate therefrom.

In accordance with one embodiment of this invention, a double sulfate salt of potassium and magnesium, preferably langbeinite, is mixed with a carbonaceous material, such as petroleum coke and also with magnesium oxide or potassium carbonate, preferably magnesium oxide recovered in a subsequent step in the process. If the magnesium oxide or potassium carbonate contains sodium chloride or other materials which are not volatilized during the subsequent furnacing operation, these impurities will contaminate the potassium carbonate product. Magnesium oxide recycled from a subsequent step in the process will contain substantially no sodium chloride and is, therefore, a preferred source of magnesium oxide when it is desired that the products of the process be chloride-free. The double salt utilized may contain up to about 2% sodium chloride by weight, but desirably will contain substantially less than this amount in order to avoid the tendency of the reaction mixture to fuse during the furnacing operation. Preferably, the langbeinite will contain less than about 1% sodium chloride by weight. Fusing of the reaction mixture during the furnacing operation is undesirable as reducing the efficiency of the operation. Extensive fusion of the charge renders the process inoperable. If there is sodium chloride present in the magnesium oxide employed, the sodium chloride content of the langbeinite must be sufficiently low so that the langbeinite-magnesium oxide-carbonaceous material mixture does not contain more than 2% sodium chloride, by weight if fusion is to be avoided. Preferably, the quantity of magnesium oxide or potassium carbonate present in the reaction admixture will amount to between about 5% and about 20%, based on the weight of langbeinite. Less than about 5% may be utilized, but the advantage of employing these materials is most significant at concentrations above about 5%. Fusion or softening of the reaction mass is not dependent solely on the sodium chloride concentration of the mixture, but may occur solely as a result of formation of sulfur compounds which form a eutectic melting in the range of temperatures employed in the furnacing operation. The presence of between about 5% and about 20% magnesium oxide and/or potassium carbonate in the reaction mixture eliminates the danger of fusion of the reaction mass due to formation of a eutectic and provides a commercially feasible process even when relatively impure starting materials having relatively high sodium chloride contents are employed.

Utilizing a langbeinite feed very low in sodium chloride content, for example, containing of the order of about 0.5% or less, it is possible to avoid fusion of the furnace charge in the absence of magnesium oxide if temperatures less than about 830° C. are employed and the reduction process is carried to a low conversion of potassium sulfate to potassium sulfide, that is, to about 60% or less of the theoretical. Utilizing a langbeinite feed high in sodium chloride content, that is, containing between about 1% and about 2% by weight of sodium chloride, magnesium oxide or potassium carbonate should be added to the mixture of langbeinite and carbonaceous material to avoid fusion or melting of this mixture during furnacing. With a leonite or schoenite feed, magnesium oxide or potassium carbonate should be added in any case.

The mixture of langbeinite, carbonaceous material and magnesium oxide is ground to a size smaller than about 50 mesh, and preferably, to a size less than about 80 mesh. The comminuted mixture is then formed into pellets in any convenient pelletizing or extrusion press. Sufficient water is added to the mixture prior to pelletizing to aid in the pellet-forming step. Usually about 10% water based on the weight of the solids mixture will be sufficient. Desirably, the amount of water should be as great as possible without causing plugging of the dies of the press. Preferably, the pellets are formed at a pressure of between about 5,000 p. s. i. and about 12,000 p. s. i. Greater pressures can be utilized if desired, but usually there is no advantage in doing so. In certain instances, depending upon the character of the materials in the mixture, less pressure may be utilized. It is only necessary to use that pressure which will produce pellets capable of being treated in a furnace at a temperature of between about 725° C. and about 1000° C. without substantial disintegration. The size of the pellets may range from between about 1/4 inch in diameter to over 1 inch in diameter. Any convenient size in this range is acceptable, and if desired, large pellets may be formed and then crushed to a smaller size before furnacing. In this case, however, care must be taken to avoid the presence in the charge of a large proportion of fine material, that is, material of less than 1/4 inch diameter.

The pellet-forming step is important in carrying out the process of this invention. Without pelleting, there is a distinct tendency of the mass to fuse during furnacing and this tendency is independent of the sodium chloride concentration of the langbeinite. The tendency of the mass to fuse is increased by the presence of fine materials in the mixture. Mixing and then pelleting has the further advantage in that it brings the carbonaceous material and langbeinite into very intimate contact, thereby facilitating the reduction of the sulfate compounds during the furnacing, that is, permitting more complete reduction of the potassium sulfate in a shorter period of time than would otherwise be possible.

The pelleted mixture is heated at a temperature between about 725° C. and about 1000° C. in any conventional reducing furnace. Preferably, however, the reaction is carried out in a direct-fired furnace operated with a reducing flame. A direct-fired rotary furnace or kiln or a direct-fired multiple hearth furnace is preferred. Generally, the furnace is operated at the lowest possible temperature which will produce substantial reduction of the potassium sulfate component of the langbeinite, and preferably at a temperature between about 775° C. and about 900° C. At high temperatures, for example, at temperatures greater than about 1000° C., there is a substantial danger of fusion of the charge regardless of sodium chloride content and fine material present, and such temperatures are avoided. At temperatures below about 725° C. no substantial reduction of the potassium sulfate component of the langbeinite takes place. When the reduction process is carried out in a direct-fired furnace, it is necessary to use a reducing flame, and preferably a reducing flame, with the quantity of air amounting to between about 50% and about 70%, preferably about 60% of that theoretically required for complete combustion of the combustible gases. A reducing flame increases the rate of the reduction reaction and the degree of reduction of the langbeinite.

The reduction reaction results in the production of a number of gaseous products, such as hydrogen sulfide, carbon monoxide, hydrogen, methane, etc. which are collected and treated for the recovery of sulfur therefrom in accordance with standard practices of the art. The reaction product solids comprise essentially potassium sulfide, magnesium oxide, and potassium sulfate, and usually contain small amounts of potassium sulfite, potassium thiosulfate, and other compounds of oxygen, potassium and sulfur. These solids are cooled in a dry non-oxidizing atmosphere to a temperature of less than about 100° C., and preferably, to less than about 50° C., and then leached with sufficient water to remove the soluble constituents therefrom. The amount of water utilized is sufficient to dissolve substantially all of the potassium salts present. The leaching results in the dissolution of substantially all of the sulfur compounds, leaving magnesium oxide as the residue. Magnesium oxide is separated from the solution by any convenient means, for example by filtration or centrifuging. Magnesium oxide thus recovered is substantially entirely free from chloride contamination and is a preferred material for mixing with langbeinite and carbonaceous material in the initial station in the process. Alternatively, the magnesium oxide may be dried and purified by calcination. Magnesium oxide thus prepared is suitable for refractory or chemical applications.

The leach solution remaining following the removal of magnesium oxide and containing essentially potassium sulfide and potassium sulfate is carbonated by passing carbon dioxide gas, for example, flue gas, through the solution until substantially all sulfide ions are removed from the solution, preferably until the pH of the solution is adjusted to between about 6 and about 7. The carbonation converts any potassium sulfide present to potassium bicarbonate or potassium carbonate and any uncombined sulfur is precipitated. The solid sulfur is removed by filtration or other convenient means. Following the removal of precipitated sulfur, the solution which contains essentially potassium bicarbonate, potassium carbonate, and potassium sulfate, and usually small amounts of the compounds of oxygen, sulfur and potassium is heated to remove excess water and then centrifuged. The cake resulting from the centrifuge operation is calcined at a temperature of between about 500° C. and about 800° C., preferably between about 600° C. and about 700° C. Calcination is preferably carried out in a direct-fired furnace heated with an oxidizing flame. The calcination converts any sulfides, sulfites, thiosulfates or other intermediate sulfur compounds to potassium sulfate. The potassium bicarbonate present is converted to potassium carbonate.

The product of the calcination reaction is treated with water in controlled amount at a temperature between about 0° C. and about 100° C., conveniently at about 60° C., to preferentially leach the water-soluble potassium carbonate from the relatively insoluble potassium sulfate. The potassium carbonate solution resulting from the leaching is separated from the insoluble potassium sulfate by any convenient means, for example by centrifugation. The potassium sulfate thus recovered is substantialy free of chloride contamination and is eminently suitable for chemical applications or for use as a fertilizer component. The potassium carbonate may be recovered from the leached solution by any standard procedure. The potassium carbonate produced is substantially free of chloride or sulfate contamination and is also suitable for a variety of commercial uses.

The process of this invention will be more readily understood by referring to the figure showing a flow sheet of a preferred embodiment of the process.

In the flow sheet langbeinite 1 is added to mixer 7 by line 2, carbonaceous material 5 is added to mixer 7 by line 6, and magnesium oxide 3 is added to mixer 7 by line 4. After thorough mixing, the mixture is transferred to grinder 9 by line 8 where it is comminuted to a size of less than about 50 mesh, and preferably, less than about 80 mesh. The comminuted mixture is then moistened with water 84, which is added by line 83, and transferred to pelletizer 11 by line 10. The amount of water added is sufficient to permit the comminuted mixture to be formed into relatively hard, rugged pellets, but is less than that amount of water which will result in plugging of the dies of the pelletizing machine. The pellets are transferred to furnace 13 by line 12 where they are heated until the potassium sulfate component of the langbeinite is substantially completely reduced to potassium sulfide. Preferably, the furnace will be a direct-fired furnace operated with a reducing flame, although an indirect-fired furnace charged with a reducing atmosphere may be utilized if greater expense and lower efficiencies can be tolerated. Exit gases from the furnace comprising volatilized sulfur, hydrogen sulfide, water vapor, oxides of carbon, etc. are conveyed to a sulfur scrubber 15 by line 14 and thence to a sulfur recovery station 17 by line 16. The sulfur component of the gases may be recovered by conventional means.

The solids product issuing from furnace 13 is conveyed to cooler 21 by line 20 where the solids are cooled in a relatively dry non-oxidizing atmosphere to a temperature below about 100° C., and preferably, to about 80° C. before being conveyed to leaching tank 26 by line 25. The presence of moisture during the cooling increases greatly the tendency of the furnace product to re-oxidize. In accordance with a preferred embodiment of this invention, the cooling of the solids prduct is effected in a reducing atmosphere, preferably by adding dry natural gas 23 to cooler 21 by line 24. The natural gas thereby absorbs heat from the solids product from the furnace and the heated natural gas is then conducted to the furnace 13 by line 22 where it is utilized as a fuel. The pre-heating of the natural gas prior to burning in furnace 13 greatly improves the efficiency of the furnace. By using the pre-heated gas as fuel for firing the furnace substantially less than the quantity of the air (about 60%) ordinarily used in burning the natural gas in the furnace can be used and with the advantage that the combustion gases produced are substantially richer in hydrogen and carbon monoxide and hydrocarbons, and poorer in carbon dioxide and water vapor, than when the gas is not pre-heated. Thus, pre-heating the natural gas improves substantially the reducing characteristics of the reducing atmosphere in the furnace and thereby the efficiency of the furnace. Passing natural gas over the solids product from furnace 13 to effect the cooling thereof also serves another purpose. The solids product being in the reduced state is susceptible to oxidation and cooling it in the presence of air, oxygen, carbon dioxide or water results in oxidation of some of the potassium sulfide component present to potassium sulfate, thereby reducing the yield of potassium carbonate in the overall process. Cooling the solids product in the presence of dry natural gas, however, prevents any oxidation of the potassium sulfide and, therefore, maintains the yield of potassium carbonate at the maximum value attainable based on the reduction attained in furnace 13. After cooling of the solids product from furnace 13 in cooler 21, the cooled solids are transferred to leaching tank 26 by line 25 where they are mixed with water 27 entering by line 28. Sufficient water is added to dissolve substantially all of the potassium sulfate present in the solids. Dissolution of all of the potassium sulfate will also result in the dissolution of all other potassium compounds in the solids, but the magnesium oxide component being insoluble in water will remain undissolved. The slurry from leaching tank 26 is conveyed to filter 30 by line 29 where the solid magnesium oxide 32 is removed by line 31 and conveyed to furnace 34 by line 33 where it is calcined. The magnesium oxide product 36 issuing from furnace 34 by line 35 is suitable for commercial refractory or chemical applications. The filtrate removed from filter 30 by line 37 is carbonated in reaction tank 38 by passing carbon dioxide or a carbon dioxide containing gas 40 into the reaction tank 38 by line 39. Treatment of the solution with carbon dioxide converts the potassium sulfide present to potassium carbonate and/or potassium bicarbonate. Carbon dioxide is passed through the filtrate until the filtrate is substantially entirely free of sulfide ions, preferably until the pH of the filtrate is adjusted to between about 6 and about 7. The carbonated solution is transferred to filter 42 by line 41 where precipitated sulfur 44 is removed by line 43. The filtrate from filter 42 comprising essentially a solution of potassium bicarbonate, potassium carbonate and potassium sulfate is transferred to evaporator 46 by line 45 where water is removed until the filtrate has a solids content of between about 30% and about 60%, preferably about 50%. The concentrated filtrate is then conveyed to centrifuge 48 by line 47. The overflow solution from centrifuge 48 is recycled to evaporator 46 by line 49 in order to minimize the loss of solids at this station. The underflow from centrifuge 48 is transferred to furnace 51 by line 50 where it is heated in an oxidizing atmosphere to convert any intermediate sulfur compounds to potassium sulfate. Potassium bicarbonate present in the solids is also converted to potassium carbonate. Preferably, furnace 51 is a direct-fired furnace, such as a direct-fired rotary furnace operated at a temperature of between about 500° C. and about 800° C., preferably between about 600° C. and about 700° C., with an oxidizing flame. The product from furnace 51 is conducted to leaching tank 53 by line 52 where it is agitated with water 82, which is added by line 81. The water is added in an amount sufficient to dissolve all of the potassium carbonate present, but insufficient to dissolve any substantial proportion of the potassium sulfate component. Preferably, the leaching operation will be carried out at the lowest possible temperature in order to minimize dissolution of potassium sulfate. The slurry produced in leaching tank 53 is then conducted to centrifuge 55 by line 54 where the potassium carbonate solution is separated from the solid potassium sulfate. The potassium carbonate solution 57 which is removed from the centrifuge by line 56 is transferred to filter 59 by line 58 to remove any potassium sulfate solids present, and the potassium sulfate solids are conveyed by line 60 to be admixed with potassium sulfate solids 71 issuing from centrifuge 55 by line 70. The filtrate from filter 59 is transferred to evaporator 62 by line 61 where it is concentrated to a solids content of between about 30% and about 60%. The concentrated liquor is transferred to centrifuge 64 by line 63 and the overflow solution from centrifuge 64 is recycled to evaporator 62 by line 65. The solids 67 issuing from centrifuge 64 by line 66 comprise essentially $K_2CO_3 \cdot 1.5H_2O$ and are sent to dryer and storage 69 by line 68. This potassium carbonate is suitable for any commercial purpose. The potassium sulfate cake 71 issuing from centrifuge 55 by line 70 is washed with water 79 which is added to the cake by line 78. The resulting slurry is transferred to centrifuge 73 by line 72. The overflow solution from centrifuge 73 is recycled to leaching tank 53 by line 80. Recycle of this solution minimizes the losses of potassium sulfate during the washing procedure. Potassium sulfate cake 75 is removed from centrifuge 73 by line 74 and sent to dryer and storage 77 by line 76.

In accordance with a preferred embodiment of this invention, magnesium oxide cake 32, which is removed from filter 30 by line 31, is in part recycled to mixer 7 where it is admixed with langbeinite 1 and carbonaceous material 5. The addition of magnesium oxide to the mixture substantially reduces the tendency of the mixture to fuse during the heat treatment in furnace 13. The addition of magnesium oxide to the mixture permits utilization of a langbeinite feed material having a sodium chloride concentration higher than would otherwise be permissible in the process.

The carbonaceous materials utilized in this invention are carbon-containing materials which are substantially non-volatile at temperatures of less than about 700° C., but which provide free carbon at temperatures attained during furnacing, that is, at temperatures above about 725° C. Materials which may be utilized include carbon black, asphalt and other petroleum distillation residues, for example, Bunker C oil. In addition, carbon-containing materials, such as sugars, wheat flour, starch, sawdust, pitch, peat, lignin, and the like may be used. Also included within the term "carbonaceous material" are coal, graphite, carbon, bone black, lamp black, coal tar pitch, and similar materials. Carbonaceous materials containing little or no ash-forming impurities are preferred and petroleum coke is particularly preferred because it is substantially entirely free of ash-forming impurities and has good handling properties. The carbonaceous material is employed in an amount of at least about 3%, and preferably between about 8% and about 17% based on the weight of langbeinite utilized. Larger quantities may be used, but there is little advantage in doing so since the added expense is not compensated by proportionately increased reaction rates or yields.

The following examples illustrate specific embodiments of this invention. All parts and percentages are by weight unless otherwise indicated.

EXAMPLE I

Langbeinite containing about 0.5% sodium chloride was mixed in an amount of about 392 parts with 39.2 parts recycled magnesium oxide and 58.8 parts uncalcined petroleum coke. These reactants were ground to a size which passed through an 80 mesh screen and then, after the addition of 49 parts water to act as a binder, formed into pellets of about 0.3 inch in diameter at a pressure of about 10,000 p. s. i.

The pelletized or granulated feed was passed through a direct-fired reducing furnace in which natural gas burned with only about 60% of the volume of air required for complete combustion. In this gas atmosphere the product was heated at about 850° C. for not less than one hour, during which period the magnesium sulfate was converted to magnesium oxide and most of the potassium sulfate was reduced to potassium sulfide.

The exit gases from the furnace contained 60.4 parts sulfur values either as sulfur vapor or hydrogen sulfide plus other combustion products. These sulfur values were recovered by passing the gases through a conventional Claus furnace.

The solid reduced product from the furnace was cooled to about 50° C. in an atmosphere of dry natural gas to avoid reoxidation of the potassium sulfide formed during the reaction. The natural gas which was thus heated by contact with the hot reaction product solid was introduced into the furnace and burned as fuel.

The cooled reduced product consisted of 88.6 parts potassium sulfide, 115.2 parts magnesium oxide, approximately one part unreacted carbon and 24.7 parts residual potassium sulfate including a small amount of other potassium, sulfur, and oxygen compounds, so-called "intermediate sulfur compounds," such as potassium sulfite, potassium thiosulfate, etc. This product was leached with water at room temperature and filtered to remove the insoluble magnesium oxide. The filter cake contained substantially all of the original magnesium values as magnesium oxide. A portion of the magnesium oxide was recycled to the start of the operation and admixed with fresh langbeinite and carbonaceous material as described above. The remainder of the filter cake was calcined at 1000° C. to yield 76 parts magnesium oxide product suitable for refractory or chemical purposes. The magnesium oxide had the composition shown in Table 1.

*Table 1*

| | | | | | |
|---|---|---|---|---|---|
| MgO | 96.22% | So₄ | 1.88% | Si | 0.19% |
| $Fe_2O_3$ | 0.76% | Na | 0.15% | $R_2O_3$ | 0.98% |
| K | 0.22% | Cl | 0.01% | Ca | 0.35% |

The filtrate consisted of 88.6 parts potassium sulfide, 24.7 parts potassium sulfate and 1089.3 parts water. This solution was treated with boiler flue gas (12% $CO_2$) at normal temperature until the solution was free of sulfide ions. The solution had attained a pH of about 6. At this point substantially all of the sulfide had been converted to carbonate or bicarbonate, the sulfide being volatilized as hydrogen sulfide gas. A small amount (approximately 3–5 parts )99% pure sulfur was precipitated in this operation and was removed by filtration. The filtered solution was evaporated to dryness to give a residue consisting of 111 parts potassium carbonate, 24.7 parts potassium sulfate (which included small amounts of residual potassium sulfide, potassium sulfite, potassium thiosulfate and other sulfur compounds). This residue was oxidized by heating in an oxidizing atmosphere at about 800° C. for the purpose of converting all intermediate sulfur compounds to potassium sulfate.

The calcined product consisting of 111 parts potassium carbonate and 24.7 parts potassium sulfate was treated with water in sufficient amount such that the carbonate was dissolved while substantially all of the sulfate remained in solid form. The slurry was centrifuged and the centrifuge cake washed and dried to yield the potassium sulfate product. The solution which contained the potassium carbonate was again evaporated and dried to yield potassium carbonate solid product. The potassium sulfate and potassium carbonate products had the compositions shown in Table 2, and Table 3, respectively. The potassium carbonate was obtained in a yield of about 76% of the theoretical based on the langbeinite starting material.

*Table 2*

POTASSIUM SULFATE COMPOSITION

| | | | |
|---|---|---|---|
| $K_2SO_4$ | 99.0% | $R_2O_3$* | 0.24% |
| $CO_2$ | 0.24% | $H_2O$ Insoluble | 0.29% |
| Cl | 0.01% | | |

*Includes oxides of Al, Ga, In, Fe, etc.

*Table 3*

POTASSIUM CARBONATE COMPOSITION

| | | | |
|---|---|---|---|
| $K_2CO_3$ | 97.0% | Mg | 0.3% |
| $SO_4$ | 0.3% | $Fe_2O_3$ | 0.05% |
| Cl | 0.75% | $SiO_2$ | 0.7% |
| Na | 0.8% | Total S as $SO_4$ | 0.6% |

EXAMPLE II

The procedure of Example I was followed with the exception that the reduced product was cooled in an atmosphere of carbon dioxide, nitrogen and water vapor. The yield of potassium carbonate amounted to about 46% of the theoretical based on the langbeinite, indicating that considerable oxidation of potassium sulfide took place during the cooling operation.

EXAMPLE III

The procedure of Example I was carried out with the exception that the solids separated from the carbonated solution of potassium sulfide and potassium sulfate following concentration of said solution were not heated in an oxidizing atmosphere, but were treated directly with water to leach the potassium carbonate therefrom. The potassium carbonate recovered from the leach water was found to contain 11.16% total sulfur expressed as sulfate.

Having thus fully described and illustrated the character of the instant invention, what is desired to be secured by Letters Patent is:

1. A process for producing potassium carbonate which comprises admixing a double sulfate salt of potassium and magnesium containing less than about 2% sodium chloride by weight with carbonaceous material and a substance selected from the group consisting of magnesium oxide and potassium carbonate, comminuating the mixture and forming the mixture into pellets, heating the pellets at a temperature between about 725° C. and about 1000° C. until the potassium sulfate component of said double sulfate salt is subtantially reduced to potassium sulfide, cooling the reaction product in a nonoxidizing atmosphere, treating the reaction product with water to dissolve the soluble constituents thereof, separating the insoluble magnesium oxide from the resulting solution, carbonating said solution until the solution is substantially entirely free of sulfide ions, whereby said potassium sulfide is converted substantially completely into potassium carbonate and bicarbonate, and recovering potassium carbonate from the carbonated solution.

2. The process of claim 1 wherein said double sulfate salt of potassium and magnesium is langbeinite.

3. The process of claim 2 in which the nonoxidizing atmosphere is dry natural gas.

4. The process of claim 3 in which the pellets are heated in a direct-fired furnace and the natural gas utilized as an atmosphere for cooling the reaction product issuing from said furnace is utilized as the fuel for firing said furnace.

5. The process of claim 3 wherein the potassium values are recovered from the carbonated solution by concentrating the solution and separating solids therefrom, oxidizing the separated solids until substantially all sulphur compounds are in the form of potassium sulfate, agitating the oxidized solids with water in an amount sufficient to dissolve all the potassium carbonate present, but insufficient to dissolve a substantial amount of potassium sulfate and recovering potassium carbonate from the resulting solution.

6. A process for producing potassium carbonate which comprises admixing langbeinite with carbonaceous material and magnesium oxide, comminuting the mixture and forming the mixture into pellets, heating the pellets at a temperature between about 725° C. and about 1000° C. until the langbeinite is substantially reduced to magnesium oxide and potassium sulfide cooling the reaction product in a nonoxidizing atmosphere, leaching the reaction product with sufficient water to remove the soluble constituents therefrom, separating the insoluble magnesium oxide from the resulting solution, carbonating said solution until the solution is substantially entirely free of sulfide ions, whereby said potassium sulfide is converted substantially completely into potassium carbonate and bicarbonate, and recovering potassium carbonate from the carbonated solution.

7. The process of claim 6 in which the magnesium oxide produced after separation from the water soluble constituents of the reaction product mixture is recycled and mixed with the langbeinite feed and carbonaceous material.

8. A process for producing potassium carbonate which comprises admixing carbonaceous material, magnesium oxide and langbeinite containing less than about 2% sodium chloride by weight, comminuting the mixture, forming the comminuted mixture into pellets, heating the pellets in a direct-fired furnace at a temperature between about 725° C. and about 1000° C. until the potassium sulfate component of the langbeinite is substantially reduced to potassium sulfide, cooling the reaction product mixture in an atmosphere of natural gas, recycling the natural gas utilized for cooling the reaction product mixture to the direct-fired furnace and utilizing said natural gas as a fuel for firing said furnace, treating the cooled reaction product with water to dissolve the soluble constituents thereof, separating the insoluble mtgnesium oxide from the resulting solution, cabor nating said solution until the solution is substantially entirely free of sulfide ions, whereby said potassium sulfide is converted substantially completely into potassium carbonate and bicarbonate, and recovering potassium carbonate from the carbonated solution.

9. The process of claim 8 in which the carbonaceous material is petroleum coke.

10. The process of claim 9 in which the pellets are heated at a temperature between about 775° C. and about 900° C.

11. A process for producing potassium carbonate which comprises admixing carbonaceous material, magnesium oxide and langbeinite containing less than about 2% sodium chloride by weight, comminuting the mixture, forming the comminuted mixture into pellets, heating the pellets in a direct-fired furnace at a temperature between about 725° C. and about 1000° C. until the potassium sulfate component of the langbeinite is substantially reduced to potassium sulfide, cooling the reaction product mixture in an atmosphere of dry natural gas, recycling the natural gas utilized for cooling the reaction product mixture to the direct-fired furnace, and utilizing said natural gas as a fuel for firing said furnace, treating the cooled reaction product with water to dissolve the soluble constituents thereof, separating the insoluble magnesium oxide from the resulting solution, carbonating said solution to a pH between about 6 and about 7, separating any solids which precipitate during the carbonation reaction, concentrating the remaining solution, separating solids from the concentrated solution, heating the separated solids in an oxidizing atmosphere until all sulfur compounds are substantially in the form of potassium sulfate, treating the heat-treated solids with sufficient water to dissolve the potassium carbonate present, but insufficient to dissolve a substantial amount of potassium sulfate, separating the resulting solution from the undissolved solids, and recovering potassium carbonate from said solution.

12. The process of claim 11 in which the carbonaceous material is petroleum coke.

13. The process of claim 12 in which the pellets are heated at a temperature between about 775° C. and about 900° C.

14. A process for producing potassium carbonate which comprises admixing langbeinite containing less than about 2% sodium chloride by weight with carbonaceous material and magnesium oxide, comminuting the mixture and forming the mixture into pellets, heating the pellets at a temperature between about 725° C. and about 1000° C. until the langbeinite is substantially reduced to magnesium oxide and potassium sulfide, cooling the reaction product mixture in an atmosphere of dry natural gas, recycling the natural gas utilized for cooling the reaction product mixture to the direct-fired furnace and utilizing said natural gas as a fuel for firing said furnace, treating the cooled reaction product with water to dissolve the soluble constituents thereof, separating the insoluble magnesium oxide from the resulting solution, recycling and admixing a portion of the magnesium oxide with fresh langbeinite feed and fresh carbonaceous material, carbonating the solution which was separated from the magnesium oxide until the solution is substantially free of sulfide ions, whereby said potassium sulfide is converted substantially completely into potassium carbonate and bicarbonate, and recovering potassium carbonate from the carbonated solution.

15. The process of claim 14 in which the carbonated solution is concentrated to separate solids therefrom, and said separated solids are heated in an oxidizing atmosphere until substantially all sulfur compounds present are in the form of potassium sulfate, agitating the oxidized solids with water in an amount sufficient to dissolve all the potassium carbonate present, but insufficient to dissolve a substantial amount of potassium sulfate, and recovering potassium carbonate from the resulting solution.

16. The process of claim 15 in which the carbonaceous material is petroleum coke.

17. The process of claim 16 in which the mixture of langbeinite, carbonaceous material and magnesium oxide is heated at a temperature between about 775° C. and about 900° C. and the solids separated from the carbonated solution are heated at a temperature between about 700° C. and about 800° C.

References Cited in the file of this patent

UNITED STATES PATENTS

| | | |
|---|---|---|
| 1,319,589 | Jones | Oct. 21, 1919 |
| 1,975,798 | Partridge | Oct. 9, 1934 |
| 1,979,151 | Fricke et al. | Oct. 30, 1934 |
| 2,590,412 | Jansen | Mar. 25, 1952 |

FOREIGN PATENTS

| | | |
|---|---|---|
| 819 | Great Britain | Mar. 17, 1869 |
| 387,229 | Great Britain | Feb. 2, 1933 |